United States Patent [19]
Loyzim

[11] 3,809,991
[45] May 7, 1974

[54] POWER SUPPLY FOR A STEPPING MOTOR

[75] Inventor: Robert James Loyzim, Coventry, Conn.

[73] Assignee: The Superior Electric Company, Bristol, Conn.

[22] Filed: Nov. 21, 1972

[21] Appl. No.: 308,316

[52] U.S. Cl.................. 318/696, 318/685, 318/341
[51] Int. Cl. .......................................... H02k 29/04
[58] Field of Search .......... 318/696, 685, 254, 138, 318/341

[56] References Cited
UNITED STATES PATENTS

| | | | |
|---|---|---|---|
| 3,424,961 | 1/1969 | Leehhouts | 318/696 |
| 3,281,630 | 10/1966 | Liang | 318/138 |
| 3,662,245 | 5/1972 | Newell | 318/696 |
| 3,560,821 | 2/1971 | Beling | 318/138 |
| 3,373,378 | 3/1968 | Cottrell | 318/138 X |
| 3,732,472 | 5/1973 | Fauve | 318/696 |
| 3,577,176 | 5/1971 | Kreithen | 318/685 |
| 3,437,899 | 4/1969 | Hirokawa | 318/696 |
| 3,665,284 | 5/1972 | Loyzim | 318/696 |

*Primary Examiner*—G. R. Simmons
*Attorney, Agent, or Firm*—Ernest M. Junkins

[57] ABSTRACT

A power circuit for supplying power to a DC energized variable speed stepping motor which for the higher speeds supplies essentially the same quantity of power as is used by the motor by supplying a variable width charge to a capacitor for each step taken by the motor with the capacitor charge being the voltage to the motor.

8 Claims, 4 Drawing Figures

POWER SUPPLY FOR A STEPPING MOTOR

In my U.S. Pat. No. 3,665,284, granted May 23, 1972, and assigned to the assignee of the present invention, there is disclosed a power supply for a stepping motor. The motor moves one step or fraction of a revolution for each change of energization of its windings and it is desirable that it operates over a wide range from standstill to thousands of steps per second. Its voltage or power requirements, however, varies not only with its speed but also with the load that the motor moves. My above-noted U.S. Patent teaches the use of a power supply in which the motor voltage is derived from three different sources. One source provides power at a low constant voltage for essentially standstill or standby conditions, another provides power at a high constant value and still another source provides power at a voltage that is variable in value in the range between the value of the low and high voltage sources. The intermediate power source utilizes an inductor which changes its impedance and hence the motor voltage with the amount of current drawn by the motor.

While such a power source has been exceedingly satisfactory, it has been found that the inductor when chosen to have a size that limited the no load low speed voltage to an acceptable value could not also be made to have such a low impedance as to provide the necessary voltage the motor required for full load, high speed operation. Thus, the high constant voltage source would be applied to the motor and at some speeds such as 1,200 to 2,000 steps per second, supply too high a voltage which would prevent continuous operation at these speeds. Moreover, though this power supply provided approximately the power needs of the motor at other speeds, it deviated sufficiently from the actual power requirements that complete utilization of the motor's capabilities was not attained.

It is accordingly an object of the present invention to provide a power supply for a stepping motor which essentially supplies the power and voltage that the motor requires even over a wide speed and load range.

Another object of the present invention is to provide a power supply for a stepping motor that senses the voltage to the motor for each step and, if needed, adds the amount of power that is required to maintain the value of the voltage to its necessary value.

A further object of the present invention is to achieve the above objects with a plural voltage power supply that is reliable in use, usable with different sizes of motors and relatively economical for the results achieved.

In carrying out the present invention, there is provided a plural voltage power supply that includes a capacitor and which supplies the power to the stepping motor by the motor windings being essentially connected across the capacitor so that the capacitor voltage is essentially the motor voltage. The power supply has, as in my above-noted U.S. Patent, a fixed low voltage source and an intermediate variable voltage source utilizing an inductor both of which are connected to supply power to the capacitor. A high voltage source also supplies power to the capacitor but it supplies only a burst of power each time the motor takes a step. The value or extent of the burst and hence its power depends on the voltage of the capacitor. By regulating the value of the burst by sensing the motor voltage and by providing a burst each time the motor is energized to take a step, the quantity of power supplied at least at the high speed range can be closely related to the power used by the motor. Accordingly, limitations on the motor's speed and load caused by the power supply are minimized as is also the elimination of the possibility of an over voltage motor damaging condition.

Other features and advantages will hereinafter appear.

Figure 1:
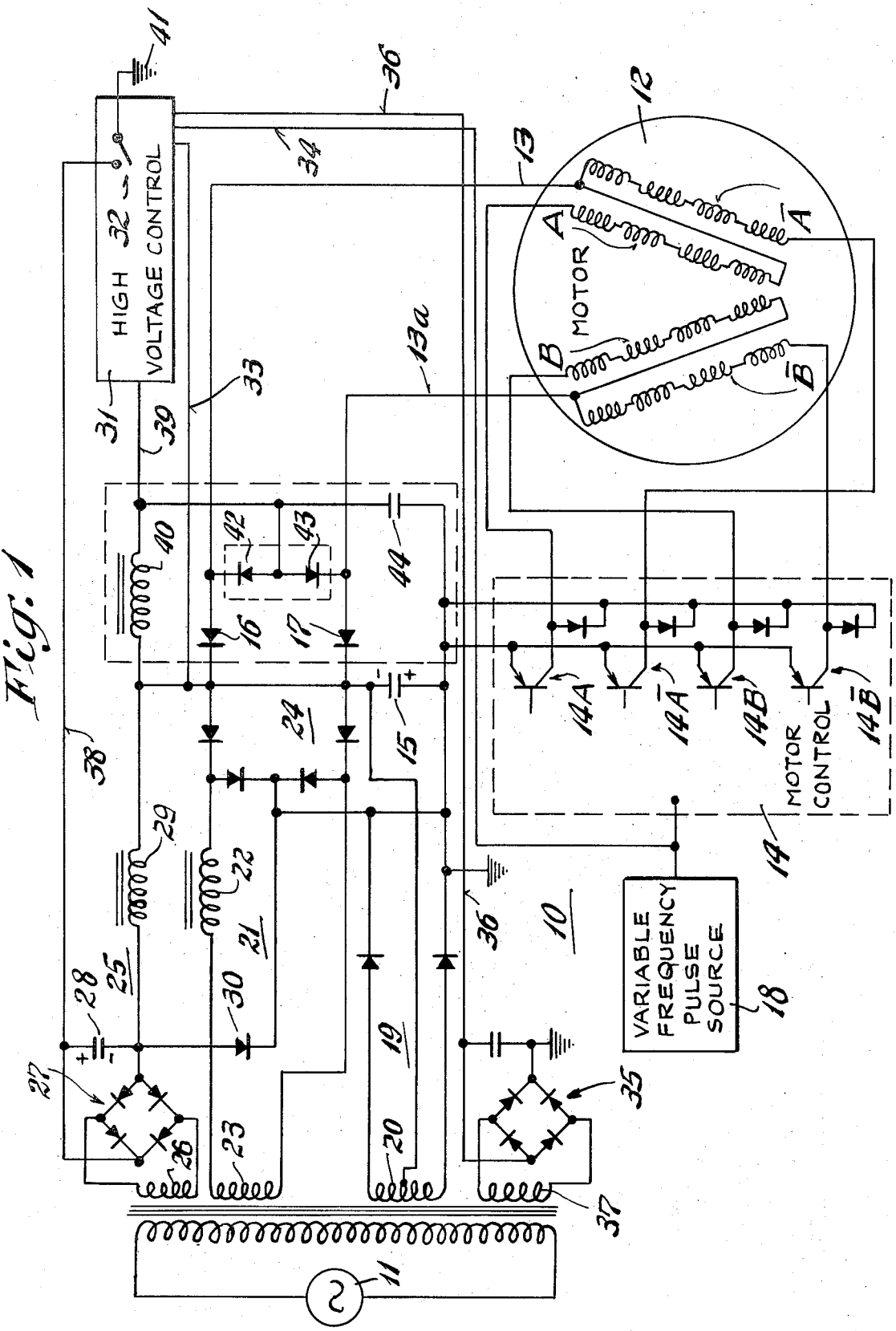
FIG. 1 is a schematic and block diagram of the power supply for a stepping motor of the present invention.

Referring to the drawing the power supply for the present invention is generally indicated by the reference numeral 10 and is utilized to provide power from an alternating current source 11 to a stepping motor 12. The motor, as diagrammatically shown has two winding sets A and $\overline{A}$ connected to a common return lead 13 and another pair of winding sets B and $\overline{B}$ connected to another common return lead 13a. The motor may be of the kind disclosed in my above-noted patent and the windings may be energized in a four step sequence AB, A$\overline{B}$, $\overline{A}\overline{B}$, $\overline{A}$B, AB etc., to advance the motor one incremental movement or step for each change of energization in one direction while if the sequence is reversed the motor will move in the opposite direction an identical increment for each change of energization as is well known in the art.

The changes of winding energizations are achieved by the use of a motor control 14 which has four outputs connected to the winding sets. The motor control has a transistor for each winding set, namely, 14A, 14$\overline{A}$, 14B, 14$\overline{B}$ so that upon conduction of a transistor, power is supplied from one side of a capacitor 15 through the emitter collector path of the winding sets' transistor such as the transistor 14A for winding A, and return lead 13, through a diode 16 to the other side of the capacitor 15. The other three transistors 14$\overline{A}$, 14B and 14$\overline{B}$ are similarly connected in parallel to place the capacitor 15 across their respective windings. The winding set $\overline{A}$ uses the return lead 13 while winding sets B and $\overline{B}$ use the return lead 13a and a diode 17 for connection to the other side of the capacitor 15. The capacitor 15 is thus placed across each winding set and its voltage is basically the voltage that is supplied to the motor.

The motor control 14 is connected to receive pulses from a variable frequency pulse source 18 and for each pulse received changes the motor windings' energization to produce one step in accordance with the above-described repeatable sequence. As the rate of the pulses may vary from none for motor standstill to 3,000 to 5,000 per second with the motor taking one step for each pulse it has been found for most effective use of the motor's capabilities that the voltage across the motor should be in the range from about 8 volts to 35 volts with its exact value depending on the motor speed, the load moved by the motor and the particular size of motor.

As described in my above-noted patent, there is initially provided through a low voltage circuit 19, a small value of unidirectional voltage to the capacitor 15 and which may be on the order of 6 or so volts. This circuit provides the minimum value of voltage supplied to the motor, irrespective of its speed. The low voltage circuit 19 obtains its power from the AC source 11 by way of transformer windings 20 and associated rectifiers connected as shown.

The intermediate power source 21 has an inductor 22 connected in series with a transformer winding 23 to receive power from the source 11 with the induction constituting a varying impedance in the AC path. The varying value of AC voltage is rectified by a full wave rectifier 24 and applied to the capacitor 15 as a varying value of unidirectional current. The motor as it increases speed, decreases the quantity of current required for each change of energization but also requires that the voltage thereacross be increased. The inductor 22 varies its impedance by having a high voltage drop for high current and low voltage drop for low current, so that the voltage produced by the intermediate circuit 21 is variable between the range of perhaps 6 volts for low speed to 20 volts for highest speeds.

The inductor has essentially a limited varying range and if made to function properly at the low speeds was incapable of functioning properly as the speeds increased beyond 1,200 steps per second. For the higher speeds my copending application disclosed the use of essentially a high constant voltage circuit for supplying power to the capacitor 15 from about 1,200 steps per second. However, this has been found to produce too much voltage to the motor for proper operation during, for example, a range of 1,200 to 2,000 steps per second and it hence prevented the motor from operating continuously in this range. Moreover, at other times, such as when the motor was decelerating, too much voltage could be applied to the motor.

However, at least for the lower speeds, the circuits 19 and 21 have been found desirable in that they utilize completely passive components for providing motor energization power and hence are extremely durable and reliable.

In accordance with the present invention in place of a high constant voltage circuit there is provided a third power circuit generally indicated by the reference numeral 25 which includes a winding 26 for receiving power from the source 11 and a full wave rectifying bridge 27 with a capacitor 28 being connected across the bridge. The negative side of the bridge and capacitor 28 are connected to the negative side of the capacitor 15 through an inductor 29 while a diode 30 blocks positive voltage. The positive side of the bridge and capacitor 28 are connected to a high voltage control 31 which, as diagrammatically shown includes a switch 32 for selective connection and disconnection to a positive ground 41.

The winding 26 has a transformer ratio which produces after rectification essentially a 70 volt charge on the capacitor 28 and if the switch 32 is closed this voltage is applied through the inductor 29 to the negative side of the capacitor 15 with the two grounded sides of the capacitors forming the return path. However, if the switch 32 is open, then the connection between the capacitor 28 and capacitor 15 is also open and so the capacitor 28 does not supply power to the capacitor 15. Normally the maximum voltage to which the capacitor 15 is charged is approximately 36 volts. The capacitor 28, however, is charged to about twice this voltage so that it is capable, when connected, of supplying power to increase the voltage of capacitor 15.

The control 31 has a connection to the negative side of the capacitor 15 by a lead 33; a connection to the variable frequency pulse source so that it receives a pulse every time the motor control 14 receives a pulse by a lead 34 and a connection to a rectified power source 35 by a lead 36 with the source 35 including a transformer winding 37 to receive power from the AC source 11. Another connection to the high voltage control 31 is a lead 38 that is connected to the negative side of the capacitor 28 while a fifth lead 39 is connected through an inductor 40 to the negative side of the capacitor 15. The high voltage control 31 is grounded as at 41.

The inductor 40, diodes 16 and 17 and diodes 42 and 43 together with a capacitor 44 constitute a path for voltages which are initially induced in a winding that is being energized by its associated winding being deenergized. The power in these induced voltages is, through the above components directed back to the capacitor 15 to not only reduce their effect on the winding being energized but also to utilize the induced power. The induced power is initially stored in the capacitor 44 and is directed back to the capacitor 15 by way of inductor 40. Thus, the voltage on the lead 39 is essentially, under most conditions, the same as the voltage on the lead 33 which is the capacitor voltage and basically the voltage supplied to the motor.

Figure 2:
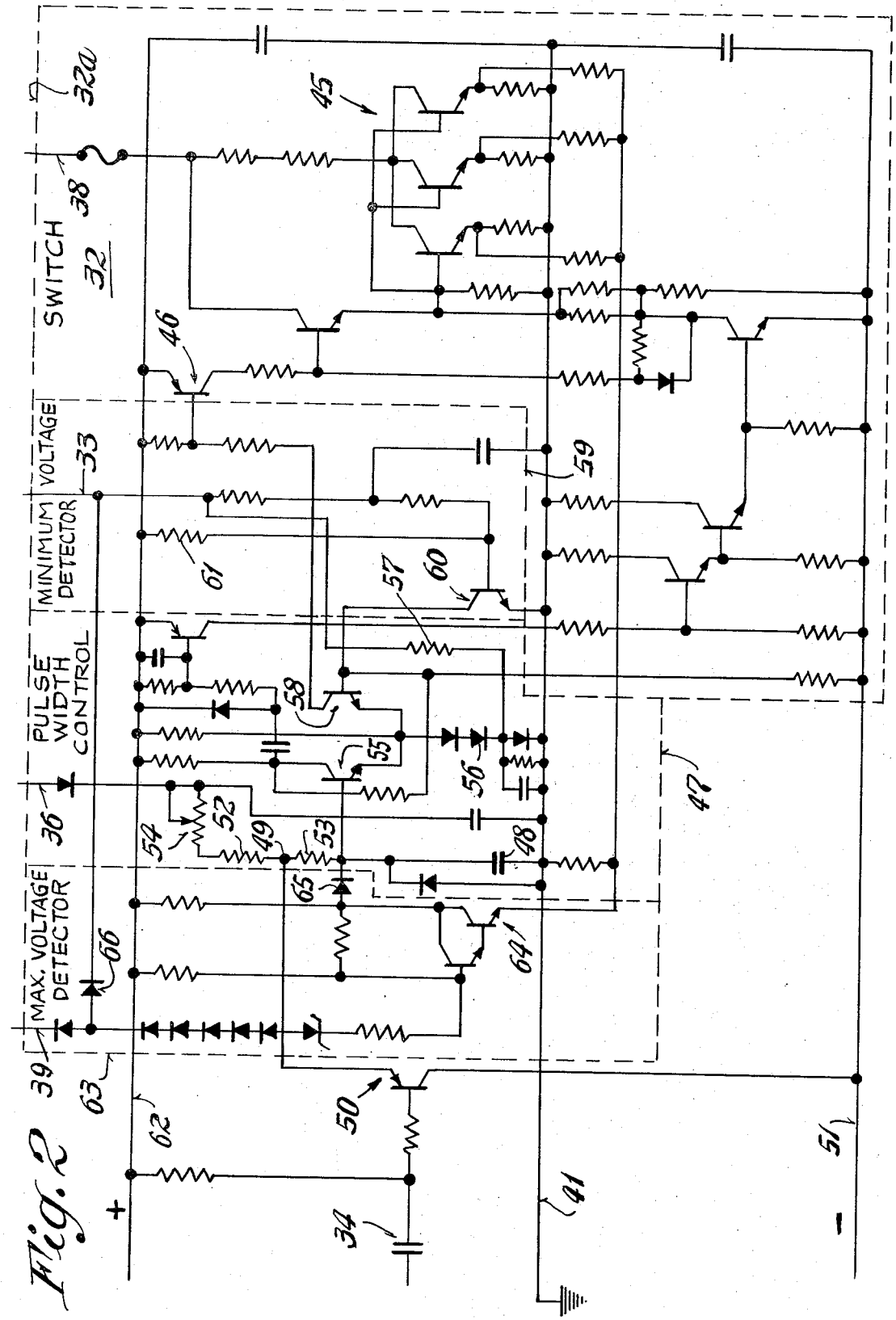
FIG. 2 is an electrical schematic diagram of the high voltage control.

Referring to FIG. 2 there is shown an electrical schematic diagram of the high power control 31 in which previously mentioned leads are indicated by the reference numerals heretofore assigned thereto. The switch 32 includes the components within the dotted line block 32a and consists of basically three parallelly connected power transistors indicated by the reference numeral 45, that are connected between the lead 38 and the ground lead 41. Conduction of the transistors 45 is controlled by the conduction of a control transistor 46 such that when transistor 46 conducts in its emitter collector path, the power transistors 45 also conduct to close the switch 32. Whenever the transistor 46 is nonconducting, then the power transistors 45 are not conducting, and the switch 32 is open.

The control of the conduction of transistor 46 is basically under the direction of a pulse width control circuit having the components enclosed within the dotted block 47. The circuit 47 includes a capacitor 48 which, upon receipt of a pulse on the lead 34 is charged to approximately −0.8 volts by connection to a point 49 which is connected through a transistor 50 to a negative supply terminal 51. The positive voltage source lead 36 of the source 35 applies through resistors 54 and 52, point 49 and resistor 53 a charging current to the capacitor 48 at a rate which is determined by the value of the resistances in the path including the variable resistance 54 and the voltage of the source 35. A transistor 55 has its base connected to one side of the capacitor 48 while its emitter is connected through a series of diodes 56 to the ground lead 41. In addition, the motor or capacitor voltage on the lead 33 is also applied through a resistance 57 to the emitter of the transistor 55 through one or more of the diodes 56 with the number of diodes being inserted being dependent upon the voltage between the base and emitter of transistor 55 at which it is desired to cause transistor 55 to conduct. The transistor 55 is connected by a common emitter connection to a transistor 58 which in turn has a connection in its collector emitter path to the base of transistor 46.

In the operation of the pulse width control circuit 47, the simultaneous receipt of a pulse to the motor control 14 on the lead 34, causes capacitor 48 to be negatively charged to approximately −0.8 volts which provides a sufficient base to emitter voltage difference on transistor 55 to cause it to become nonconducting. This makes transistor 58 conduct which in turn makes transistor 46 conduct to in effect close the switch 32 by making transistors 45 conduct. After its initial negative charge, the capacitor 48 immediately starts receiving a positive charging voltage from the lead 36 through the resistors 54, 52 and 53 and will, as it positively increases its voltage, reach a value which starts transistor 55 conducting. When this occurs transistor 58 is rendered nonconducting which also stops conduction of switch 32 to prevent further transfer of energy from the capacitor 28 to the capacitor 15.

It will be appreciated that with this circuit 47 the duration when the switch 32 is closed begins with the initial receipt of a pulse on the lead 34. Its extent exists until a minimum differential voltage exists between the base and emitter of transistor 55. The emitter voltage is inversely proportional to the motor supply voltage while the time required for the base to reach a value necessary for conduction is proportional to the values of the A.C. input voltage. Thus, as the motor voltage increases it lowers, i.e., makes less positive the value of the voltage at the emitter of transistor 55 and in doing so decreases the extent of the duration for the capacitor 48 to charge to a value necessary to cause conduction of transistor 55. Moreover, the charging rate of the capacitor 48 is dependent after the resistor 54 is set, upon the value of the A.C. source 11 and as it decreases, for example, the charge rate is slower, increasing the period of nonconduction of transistor 55 while if the line voltage is high the charging rate is faster and decreases the duration thereby in effect regulating the power supplied by a high power source in accordance with the value of the A.C. source 11.

The high voltage control is prevented from supplying power to the capacitor 15 for values of the capacitor voltage below a preselected value, as for example, −5 volts by means of a minimum voltage detector enclosed within the dotted line 59. This circuit includes a transistor 60 which has its base connected to the lead 33 and has its emitter collector path connected between the base of transistor 58 and the ground lead 41 such that for low values of voltage the transistor 60 is conducting which prevents transistor 58 from conducting and hence closing the switch 32. The voltage at which transistor 60 is caused to be nonconducting to enable switch 32 to be operated may be set by the value of a resistor 61 connected between a plus voltage source 62 and the base thereof. This circuit 59 has been found useful for preventing the high voltage circuit from supplying power when a short circuit or other malfunctioning of the motor exists which would tend to maintain the value of the capacitor voltage below the circuit's minimum value.

The control 31 further includes a maximum voltage detector circuit for preventing the supplying of power by the circuit 25 in the event that the capacitor voltage 15 is above a preselected value as, for example, 36 volts. This circuit is enclosed within the dotted line 63 and includes a transistor 64 which is normally maintained conducting when the voltage on the lead 39 is below the selected maximum value. If the voltage should exceed this value, the transistor 64 ceases to conduct, increasing the positive value of its collector voltage which rapidly charges the capacitor 48 through a diode 65. This rate of charging is much quicker than the rate caused by the normal charging path through resistors 54, 52 and 53 thereby making the capacitor 48 assume the voltage value which causes conduction of the transistor 55 extremely quickly. When the transistor 64 conducts, its collector voltage has such a low positive value that it is insufficient to pass through the diode 65 to effect the charging of the capacitor 48.

The lead 39 is connected by a diode 66 to the lead 33 and thus has maintained thereon a voltage which corresponds in value (less the diode voltage drop) to the voltage applied to the motor. However, in view of the lead 39 being connected to the inductor 40 it assumes the same voltage as the inductor 40 which at times when the motor is decelerating may exceed the motor supply voltage by reason of the motor basically functioning as a generator and producing higher values of induced voltage power than the power to produce each step. In this event the maximum voltage detector circuit 63 is responsive to the higher induced voltage to decrease or essentially stop completely the time the switch 32 is maintained closed.

Figure 3:
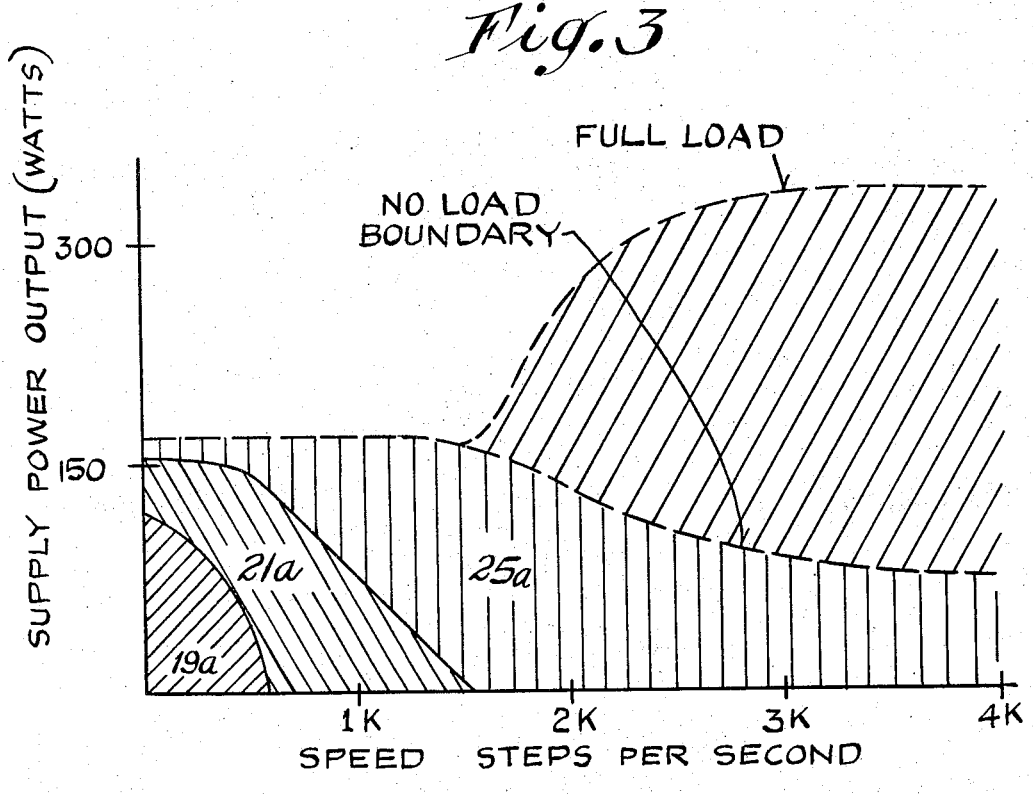
FIG. 3 is a plot of the power required by the motor at various speeds and the sources of the power.

Shown in FIG. 3 is a plot of the power supplied to the motor in watts versus motor speed in steps per second for one size of motor which may be operated by the present power supply. The area indicated by the reference numeral 19a is the power supplied by the low constant voltage source 19 and, as shown, has its maximum effect at standstill or zero steps per second and becomes negligible at about 500 steps per second. The low constant voltage supply 19 thus provides most of the large amount of current required for low speed operation, economically, simply and effectively. The intermediate variable voltage source 21 provides most of the remaining power for the lower speeds of the motor as indicated by the area 21a on the plot. The high power circuit 25 supplies the small remainder of the power for speeds to about 600 steps per second. As the speed increases the high voltage circuit 25 supplies more power (25a) until at about 1,000 steps per second the power is roughly divided in half between the circuits 21 and 25. As the speed further increases, the circuit 21 supplies lesser and lesser power to the motor until at about 1,500 steps per second, when the circuit 25 is providing substantially all the power to the motor. Beyond about 1,500 steps per second, the power supplied by the circuit 25 will vary with the load on the motor. Thus, the line designated no load boundary indicates the power supplied when there is no load on the motor and it is substantially less than that needed when the motor has a "full load," as indicated.

This drastic difference in power at the same speed between no load and full load is easily accommodated by the high voltage circuit 25 because at the no load condition, the capacitor 15 voltage does not tend to decrease as much with a change of energization as it does at full load as the motor takes less current for a lesser period of time thereby reducing the duration that the switch 32 is closed and hence supplying power to the capacitor 15. Thus, the high load high voltage circuit 25 not only is capable of varying the power supplied to the motor for different rates of speed but also for different load conditions.

Figure 4:
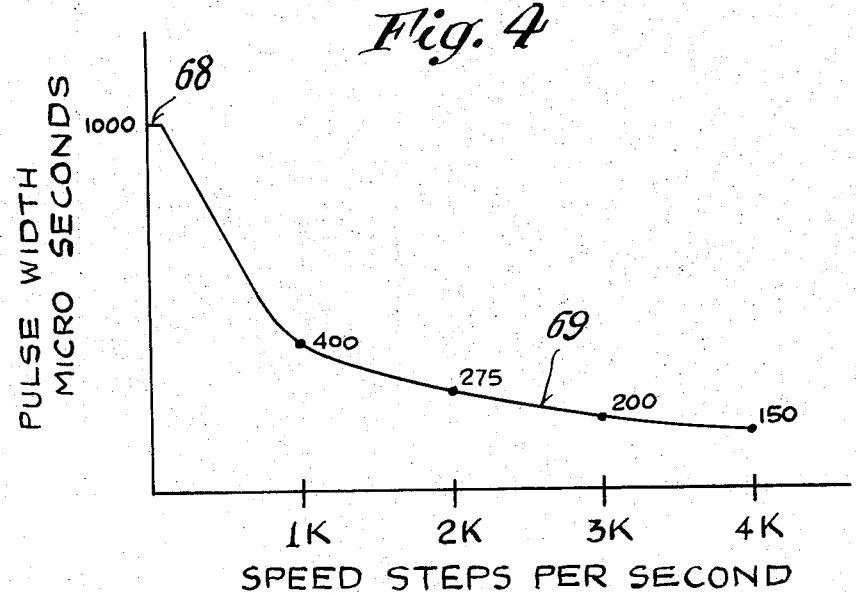
FIG. 4 is a graph showing the pulse width supplied by the high frequency sources for various speeds under a no load condition.

Shown in FIG. 4 is a plot of pulse width against speed for a no load condition of a motor. It will be seen that a substantially constant pulse width extends for perhaps the first 100 steps (indicated by the reference numeral 68) and then decreases with increasing speed to somewhat level off, as at 69, at about 3,000 steps per second.

While the herein disclosed embodiment of a power circuit discloses the use of three separate source circuits, it is contemplated that if desired the circuit 21 could be eliminated with the high voltage circuit being adjusted to additionally supplying the power to the motor that would normally be obtained from this circuit 21.

It will accordingly be understood that there has been disclosed a power circuit for supplying power to a stepping motor which includes a high voltage circuit that supplies essentially all the power at higher speeds. The high voltage circuit supplies a burst of power for each step the motor takes with the burst being at a voltage much higher than the voltage applied to the motor. However, this extent is adjusted by sensing the voltage to the motor so that it doesn't impress upon the motor a value higher than a preselected maximum.

Variations and modifications may be made within the scope of the claims and portions of the improvements may be used without others.

I claim:

1. In combination with a digital stepping motor of the type having stator windings that produce an incremental movement for each change of energization of at least some of the windings by unidirectional current, a control circuit having an output connected to the windings to provide a change of energization of the stator windings upon receipt of a command pulse, a command pulse supplying means for providing command pulses to the control circuit at a rate that determines the operating speed of the motor with the rate being variable from none to a relatively high value, power means having output terminals connected to the control circuit to provide the unidirectional output power that the control circuit supplies to the stator windings to effect the change of energization, the improvement comprising a high voltage circuit in said power means for supplying a variable quantity of power to said power means output terminals for each change of energization above a preselected rate of command pulses with a connection to the command pulse supplying means and including means for continually sensing the value of the voltage at the output terminals and controlling the quantity of power in accordance with the sensed voltage.

2. The invention as defined in claim 1 in which the high voltage circuit receives the command pulse simultaneously with the receipt thereof by the control circuit and in which the power supplied by the high voltage circuit begins with the receipt of the command pulse.

3. The invention as defined in claim 1 in which the high voltage circuit includes means for preventing the supplying of power when the voltage at the motor exceeds a preselected value.

4. The invention as defined in claim 1 in which the power means includes another circuit for supplying power to the output terminals adjustable in accordance with the lower speeds of the motor and in which the high voltage circuit includes means for preventing the supplying of substantial power therefrom for the lower speeds of the motor.

5. The invention as defined in claim 1 in which the power circuit supplies a preselected maximum voltage to the motor, in which the high power circuit includes a voltage source that has a value of voltage higher than the maximum voltage and in which the high power circuit supplies power only intermittently to the power circuit output terminals.

6. The invention as defined in claim 5 in which the output terminals of the power circuit have a capacitor connected thereacross and in which the high voltage source supplies bursts of higher voltage power to the capacitor.

7. The invention as defined in claim 1 in which the power means includes a connection to a source of A.C. for supplying power to the high voltage circuit and in which the high voltage circuit varies the power supplied to the output inversely with changes in the value of voltage of the A.C. source.

8. The invention as defined in claim 1 in which the high voltage circuit includes a pulse width control means for normally providing a duration for each change of energization during which the high voltage circuit supplies power to the output terminals and in which the control means includes means for changing the duration inversely with the voltage at the output terminals.

* * * * *